April 21, 1931.  G. W. VEALE  1,802,189
BUMPER
Filed May 31, 1930
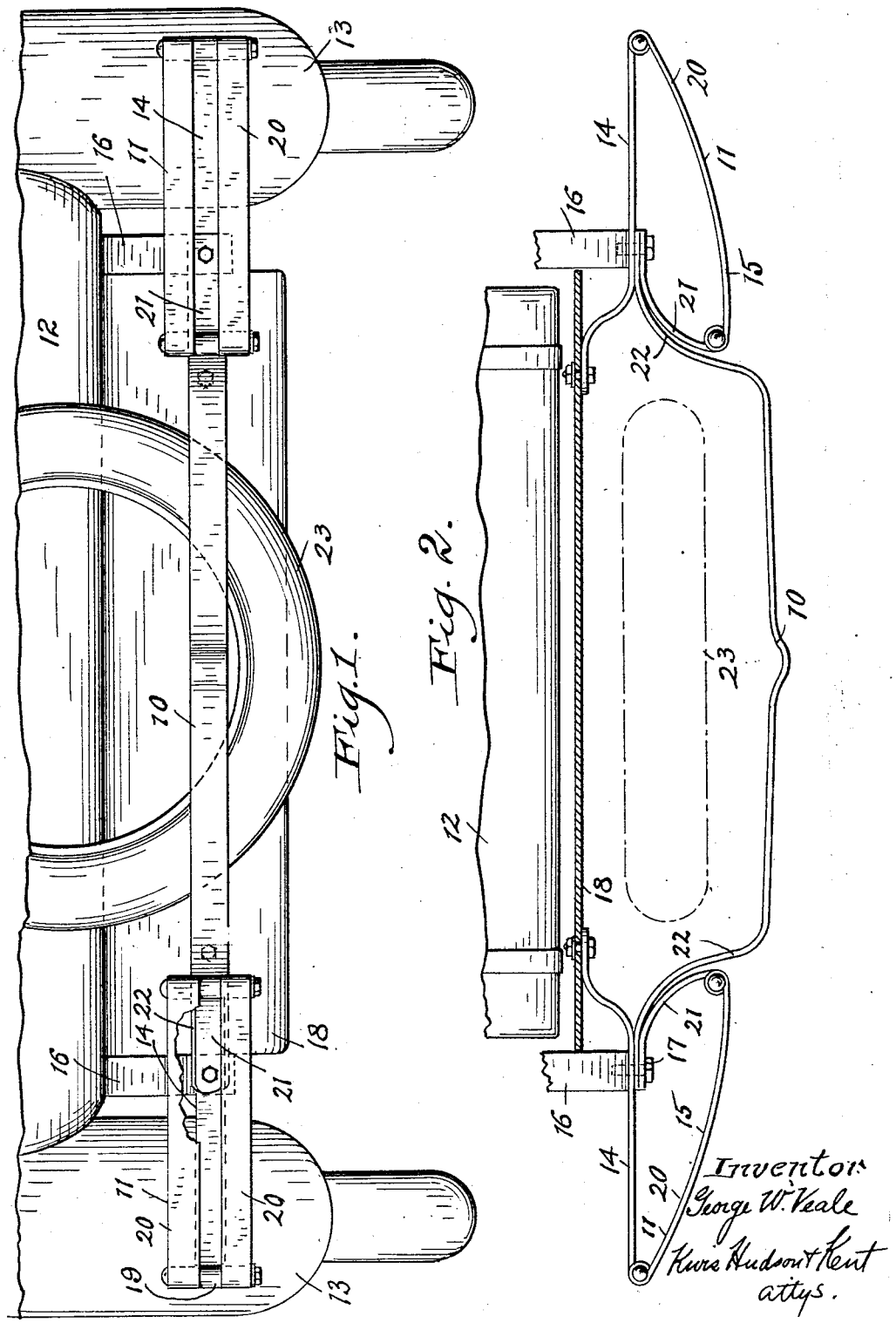

Patented Apr. 21, 1931

1,802,189

UNITED STATES PATENT OFFICE

GEORGE W. VEALE, OF CLEVELAND HEIGHTS, OHIO, ASSIGNOR TO THE EATON AXLE & SPRING COMPANY, OF CLEVELAND, OHIO, A CORPORATION OF OHIO

BUMPER

Application filed May 31, 1930. Serial No. 457,719.

This invention relates to vehicle bumpers, and, as its principal object, aims to provide an improved form of connecting means for bumpers of the type which are spaced apart and independently secured to the vehicle.

Other objects and advantages of this invention will be apparent from the following description taken in conjunction with the accompanying sheet of drawings, in which Figure 1 is an elevational view showing the rear portion of a vehicle having spaced bumpers to which the connecting device of my invention has been applied; and Fig. 2 is a top plan view of the arrangement illustrated in Fig. 1.

The drawings, which illustrate my invention, show my connecting device 10 applied to bumpers 11 which are spaced apart and independently secured to the vehicle 12 so as to extend transversely in a protective position just rearwardly of the fenders 13.

My connecting device may be applied to the bumpers 11 by the manufacturer as a part of the original equipment of the vehicle, or may be quickly and easily installed as an accessory fitting by the user of the vehicle.

It will be understood, of course, that the connecting device of my invention is applicable to various forms of bumper constructions of the type mentioned, one of which, as herein illustrated, comprises a supporting arm 14 and impact cushioning means 15 secured thereto. The arm 14 extends transversely of the vehicle in a substantially horizontal plane, and, by means of the clamping member 17, is secured intermediate its ends to a suitable portion of the vehicle structure, such as the frame member 16. The inner end of the arm, or, in other words, the end thereof which is nearest the center line of the vehicle, is anchored or secured by being clamped to another portion of the vehicle structure, such as the plate member 18. At the outer end of the arm or, in other words, at the end thereof which is most remote from the center line of the vehicle, this arm is provided with an eye 19 for supporting pivotal connection with the outer end of the cushioning means. This cushioning means comprises the vertically spaced impact bars 20 and the relatively short, arcuate connecting member or auxiliary arm 21. At their outer ends the impact bars are pivotally connected to the eye 19 of the arm 14 and at their inner ends are pivoted to one end of the arcuate member 21. This member extends forwardly and is curved outwardly from its pivotal connection with the impact bars, and at its outer end is clamped to the arm 14 and to the supporting portion of the vehicle by the clamping member 17.

The connecting device of my invention, when assembled in place, extends transversely between the spaced vehicle bumpers 11 in a substantially horizontal plane. My connecting device may be constructed of any suitable material, such as a bar of spring steel, having opposite end portions thereof bent to provide supporting arms 22. These supporting arms extend forwardly and are curved outwardly to correspond in shape with the arcuate bulges which the members 21 impart to the inner ends of the cushioning means of the bumpers. The extreme end portions of these curved arms extend between the supporting arms 14 and the members 21 of the cushioning means, and are secured in place by the same clamping members which secure the cushioning means to the supporting arms 14 and to the vehicle structure. By constructing the curved arms of the connecting device so that they conform to the shape of the inner ends of the cushioning means, the connecting device reenforces the bumpers against angularly delivered blows.

The arms 22 are preferably made sufficiently long so that, in addition to its function as a reenforcement for the vehicle bumpers, my connecting device is spaced rearwardly of and affords protection for the spare wheel 23 which is usually carried at the rear of the vehicle. Furthermore, my connecting device adds to the completeness of the appearance of the vehicle, and, when suitably finished to harmonize with other portions, adds to the attractiveness and distinctiveness of the vehicle.

While I have described the device of my invention in a detailed manner, it should be understood, however, that I do not intend to limit myself to the precise details illustrated and described, but regard my invention as embracing such changes and modifications as do not involve a departure from the spirit of the invention and the scope of the appended claims.

Having thus described my invention, I claim:

1. The combination with a vehicle having spaced bumper means comprising supporting bars, and impact cushioning means carried by said supporting bars, of connecting means having end portions thereof clamped between said supporting bars and the respective cushioning means carried thereby.

2. The combination with a vehicle having independent bumper means thereon each including supporting means, and impact cushioning means having inner end portions thereof clamped to said supporting means, of means connecting said independent bumper means, said connecting means having forwardly and outwardly extending arcuate arm portions corresponding in shape with and adapted to be engaged by portions of said cushioning means, said arcuate arm portions having their free ends clamped between said cushioning means and said supporting means.

3. The combination with a vehicle having independent bumper means thereon each including supporting means, and impact cushioning means having inner end portions thereof clamped to said supporting means, of means connecting said independent bumper means, said connecting means having forwardly and outwardly extending arcuate arm portions corresponding in shape with and adapted to be engaged by portions of said cushioning means, said arcuate arm portions having their free ends secured between said supporting means and said cushioning means by the same means which clamps the latter means to said supporting means.

4. A device for connecting independent bumper means of a vehicle comprising a member having at opposite ends thereof forwardly and outwardly extending arcuate arms adapted to engage portions of said bumper means and the free ends of said arms being adapted to be clamped between the cushioning portions and supporting portions of the bumper means.

In testimony whereof, I hereunto affix my signature.

GEORGE W. VEALE.